(12) United States Patent
Jaquez et al.

(10) Patent No.: US 10,558,214 B2
(45) Date of Patent: Feb. 11, 2020

(54) MANUAL CONTROL MODES FOR AN AUTONOMOUS MOBILE ROBOT

(71) Applicant: Locus Robotics Corp., Wilmington, MA (US)

(72) Inventors: Luis Jaquez, Burlington, MA (US); Sean Johnson, Danvers, MA (US); Michael Charles Johnson, Ashland, MA (US)

(*) Notice: Subject to any disclaimer, the term of this patent is extended or adjusted under 35 U.S.C. 154(b) by 78 days.

(21) Appl. No.: 15/888,786

(22) Filed: Feb. 5, 2018

(65) Prior Publication Data
US 2019/0243358 A1   Aug. 8, 2019

(51) Int. Cl.
| | |
|---|---|
| *B25J 5/00* | (2006.01) |
| *G05D 1/00* | (2006.01) |
| *B25J 9/16* | (2006.01) |
| *B65G 1/137* | (2006.01) |
| *G05D 1/02* | (2020.01) |
| *G05B 19/12* | (2006.01) |

(52) U.S. Cl.
CPC ............ *G05D 1/0061* (2013.01); *B25J 5/007* (2013.01); *B25J 9/163* (2013.01); *B25J 9/1676* (2013.01); *B65G 1/1375* (2013.01); *G05D 1/0088* (2013.01); *G05D 1/0238* (2013.01); *G05D 1/0274* (2013.01); *G05D 1/0276* (2013.01); *G05B 19/124* (2013.01); *G05B 2219/23363* (2013.01)

(58) Field of Classification Search
CPC .. G05D 1/0061; G05D 1/0088; G05D 1/0238; G05D 1/0274; G05D 1/0276; B25G 1/1375; B25J 9/1676; B25J 5/007
See application file for complete search history.

(56) References Cited

U.S. PATENT DOCUMENTS

| | | | | |
|---|---|---|---|---|
| 7,402,018 | B2* | 7/2008 | Mountz | B60D 1/465 414/331.06 |
| 8,425,173 | B2* | 4/2013 | Lert | B65G 1/045 414/280 |
| 8,965,561 | B2* | 2/2015 | Jacobus | G06Q 10/087 700/216 |

(Continued)

FOREIGN PATENT DOCUMENTS

WO   2007/149227 A2   12/2007

OTHER PUBLICATIONS

International Search Report and Written Opinion, dated Jun. 25, 2019, received in international patent application No. PCT/US19/16512, 11 pages.

*Primary Examiner* — Patrick H Mackey
(74) *Attorney, Agent, or Firm* — Verrill; John W. Powell

(57) ABSTRACT

A method for performing tasks on items located in a space using a robot, includes receiving an order to perform a task on at least one item and obtaining a pose associated with the at least one item. The pose is in a coordinate system defined by the space and the pose is where the task is to be performed on the at least one item. The method includes navigating the robot toward the pose associated with the at least one item and detecting, when in proximity to the pose, if the pose is obstructed by an object. If the pose is obstructed by an object, halting the robot at a location spaced from the pose and then causing the robot to provide a first signal indicating that the robot is in a holding mode at the location spaced from the pose.

16 Claims, 12 Drawing Sheets

(56) References Cited

U.S. PATENT DOCUMENTS

| | | | |
|---|---|---|---|
| 9,463,927 B1 | 10/2016 | Theobald | |
| 9,534,906 B2* | 1/2017 | High | E01H 5/12 |
| 9,550,624 B2* | 1/2017 | Khodl | B25J 5/007 |
| 9,758,305 B2 | 9/2017 | Johnson et al. | |
| 10,217,074 B1* | 2/2019 | Stallman | G06Q 10/08 |
| 2007/0136152 A1* | 6/2007 | Dunsker | G06Q 10/08 |
| | | | 705/28 |
| 2007/0198174 A1* | 8/2007 | Williams | G06Q 10/047 |
| | | | 705/1.1 |
| 2008/0009965 A1* | 1/2008 | Bruemmer | G05D 1/0088 |
| | | | 700/245 |
| 2008/0166217 A1* | 7/2008 | Fontana | B66F 3/08 |
| | | | 414/800 |
| 2010/0296908 A1 | 11/2010 | Ko | |
| 2011/0200420 A1 | 8/2011 | Driskill | |
| 2012/0143427 A1* | 6/2012 | Hoffman | G06Q 10/087 |
| | | | 701/23 |
| 2012/0330458 A1 | 12/2012 | Weiss | |
| 2013/0317642 A1 | 11/2013 | Asaria et al. | |
| 2017/0029213 A1* | 2/2017 | Johnson | B65G 1/1378 |
| 2018/0299888 A1* | 10/2018 | Sullivan | G05D 1/0061 |

\* cited by examiner

| Fiducial ID | x | y | z | quaternion.x | quaternion.y | quaternion.z | quaternion.w |
|---|---|---|---|---|---|---|---|
| 1 | -10.2 | 2.3 | 0 | 0 | 0 | 0 | 1 |
| 2 | 23.1 | 15.8 | 0 | 0 | 0 | 0 | 1 |
| 3 | 45.3 | 3.3 | 0 | 0 | 0 | -1 | 0 |

| Location | Fiducial ID |
|---|---|
| L01001A | 11 |
| L01001B | 11 |
| L01001C | 11 |
| L01001D | 11 |
| L01001E | 11 |
| L01001F | 11 |
| L01002A | 12 |
| L01002B | 12 |
| L01002C | 12 |
| L01002D | 12 |
| L01002E | 12 |
| L01003A | 13 |
| L01003B | 13 |
| L01003C | 13 |
| L01003D | 13 |
| L01003E | 13 |
| L01003F | 13 |
| L01004A | 14 |
| L01004B | 14 |
| L01004C | 14 |
| L01004D | 14 |
| L01004E | 14 |
| L01005A | 15 |
| L01005B | 15 |
| L01005C | 15 |
| L01005D | 15 |
| L01005E | 15 |
| L01005F | 15 |

FIG. 7

MANUAL CONTROL MODES FOR AN AUTONOMOUS MOBILE ROBOT

FIELD OF THE INVENTION

This invention relates to an autonomous mobile robot and more particularly to an autonomous mobile robot having modes of operation which may be manually controlled by an operator.

BACKGROUND OF THE INVENTION

In many applications, autonomous mobile robots are used to perform functions in place of humans or to assist humans in order to increase productivity and efficiency. One such application is order fulfillment, which is typically performed in a large warehouse filled with products to be shipped to customers who have placed their orders over the internet for home delivery.

Fulfilling such orders in a timely, accurate and efficient manner is logistically challenging to say the least. Clicking the "check out" button in a virtual shopping cart creates an "order." The order includes a listing of items that are to be shipped to a particular address. The process of "fulfillment" involves physically taking or "picking" these items from a large warehouse, packing them, and shipping them to the designated address. An important goal of the order-fulfillment process is thus to ship as many items in as short a time as possible. In addition, the products that will ultimately be shipped first need to be received in the warehouse and stored or "placed" in storage bins in an orderly fashion throughout the warehouse so they can be readily retrieved for shipping.

Using robots to perform picking and placing functions may be done by the robot alone or with the assistance of human operators. One system which utilizes autonomous mobile robots with the assistance of human operators is described in U.S. Pat. No. 9,758,305. With this system, robots navigate to poses (consisting of the x,y,z coordinates in the warehouse along with the orientation or the quaternion (x,y,z, ω) associated with each item they need to retrieve for an order. Once at the pose, a human operator can read the details of the item to be picked from, for example, a tablet on the robot, pick the item to be retrieved from the appropriate bin located on a shelf unit, and place it on the robot. While this is a very efficient system that supports very high order throughput, efficiencies may be improved in certain situations by allowing the human operators to assume limited manual control.

BRIEF SUMMARY OF THE INVENTION

The benefits and advantages of the present invention over existing systems will be readily apparent from the Brief Summary of the Invention and Detailed Description to follow. One skilled in the art will appreciate that the present teachings can be practiced with embodiments other than those summarized or disclosed below.

In one aspect, the invention includes a method for performing tasks on items located in a space using a robot. The method includes receiving an order to perform a task on at least one item and obtaining a pose associated with the at least one item; the pose being in a coordinate system defined by the space and the pose being where the task is to be performed on the at least one item. The method includes navigating the robot toward the pose associated with the at least one item and detecting, when in proximity to the pose, if the pose is obstructed by an object. If the pose is obstructed by an object, halting the robot at a location spaced from the pose and Causing the robot to provide a first signal indicating that the robot is in a holding mode at the location spaced from the pose.

In other aspects of the invention, one or more of the following features may be included. The robot may be in the holding mode, allowing a human operator to instruct the robot to pause at the location spaced from the pose and having the operator perform the task on the at least one item even though the robot has not reached the pose. The human operator may pause continued operation, causing the robot to provide a second signal different from the first signal to indicate that continued operation of the robot has been paused. In the holding mode, the robot my provide the human operator the ability to instruct the robot to bypass the pose without performing the task on the at least one item. In the holding mode, the robot may provide the human operator the ability to instruct the robot to remain in the holding mode until the robot detects that the pose is no longer obstructed by the object. In the holding mode, the robot may provide on a display inputs to allow the operator to select one of pausing continued operation of the robot, bypassing the pose, or remaining in the holding mode. The first and second signals may be provided by causing one or more lights on an exterior of the robot to be illuminated. The one or more lights on an exterior of the robot may be caused to be illuminated in more than one color or in an intermittent manner to distinguish between the first and second signals. The task may include one of retrieving the at least one item and placing it on the robot or removing the at least one item from the robot and storing it proximate the fiducial marker. The space may be a warehouse containing a plurality of items stored in a plurality of containers dispersed throughout the warehouse. The object may be one of another robot, a human operator or an inanimate object.

In another aspect the invention features a robot for performing tasks on items located in a space. The items being located proximate fiducial markers, each fiducial marker having a fiducial identification. The robot includes a processor configured to receive an order to perform a task on at least one item and determine the fiducial identification associated with the at least one item. The processor also obtains, using the fiducial identification of the at least one item, a pose associated with a position of the fiducial marker with the determined fiducial identification, in a coordinate system defined by the space. There is a navigation system configured to navigate the robot to the pose of the fiducial marker associated with said determined fiducial identification. There is a display configured to communicate to an operator the task to be performed on the at least one item and a sensor configured to detect, when in proximity to the pose, if the pose is obstructed by an object. If the sensor detects that the pose is obstructed by an object, the processor is configured to stop the robot a location spaced from the pose and cause the robot to provide a first signal that the robot is in a holding mode.

In other aspects of the invention, one or more of the following features may be included. When the robot is in the holding mode, the processor may be configured to provide a human operator the ability to instruct the robot to pause continued operation of the robot so that the operator may perform the task on the at least one item even though the robot has not reached the pose. When the human operator pauses continued operation, the processor may be configured to cause the robot to provide a second signal different from the first signal to indicate that continued operation of the robot has been paused. When the robot is in the holding mode, the processor may be configured to provide the human operator the ability to instruct the robot to bypass the pose of the fiducial marker associated with said determined fiducial identification without performing the task on the at least one item. When the robot is in the holding mode, the processor may be configured to provide the human operator the ability to instruct the robot to remain in the holding mode until the robot detects that the pose is no longer obstructed by the object. When the robot is in the holding mode, the processor may be configured to provide on the display inputs to allow the operator to select one of pausing continued operation of the robot, bypassing the pose, or remaining in the holding mode. The robot may further include one or more lights on an exterior of the robot and the processor may be configured to cause the one or more lights to be illuminated to provide the first and second signals. The processor may be configured to cause the one or more lights to be illuminated in more than one color or in an intermittent manner to distinguish between the first and second signals. The task may include one of retrieving the at least one item and placing it on the robot or removing the at least one item from the robot and storing it proximate the fiducial marker. The space may be a warehouse containing a plurality of items stored in a plurality of containers dispersed throughout the warehouse. The object may be one of another robot or another human operator.

In yet another aspect the invention features a method for performing tasks on items located in a space using a robot. The method includes receiving an order to perform a task on at least one item and determining a location associated with the at least one item. The method also includes navigating the robot to the location associated with the at least one item and communicating to an operator the task to be performed on the at least one item. The method also includes, when in proximity to the location, detecting if the location is obstructed by an object and, if the location is obstructed by an object, stopping the robot at a location spaced from the location. And, the method includes causing the robot to provide a first signal that the robot is in a holding mode.

In further aspects the invention features a robot for performing tasks on items located in a space. The robot includes a processor configured to receive an order to perform a task on at least one item and to determine a location in the space associated with the at least one item. There is a navigation system configured to navigate the robot to the location and a display configured to communicate to an operator the task to be performed on the at least one item. There is also a sensor configured to detect, when in proximity to the location, if the location is obstructed by an object and if the sensor detects that the pose is obstructed by an object, the processor is configured to stop the robot at a location spaced from the pose. The processor is also configured to cause the robot to provide a first signal that the robot is in a holding mode.

These and other features of the invention will be apparent from the following detailed description and the accompanying figures.

BRIEF DESCRIPTION OF THE FIGURES

Embodiments of the present invention will now be described, by way of example only, with reference to the attached Figures, wherein:

FIG. 6 is a table of the fiducial identification to pose mapping;

FIG. 7 is a table of the bin location to fiducial identification mapping;

DETAILED DESCRIPTION OF THE INVENTION

Figure 1:
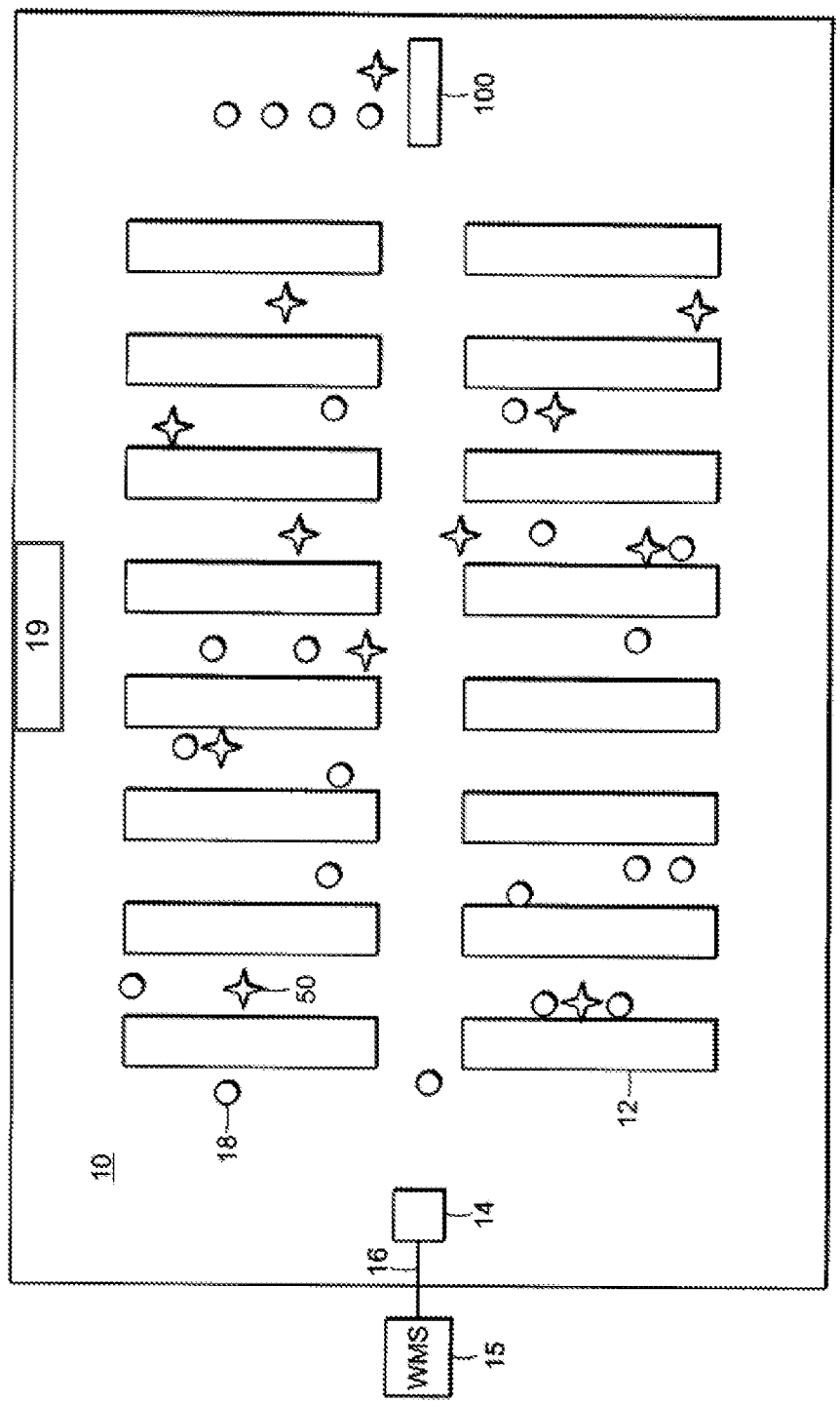
FIG. 1 is a top plan view of an order-fulfillment warehouse.

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

The disclosure is directed to an autonomous mobile robot and more particularly to an autonomous mobile robot having modes of operation which may be manually controlled by an operator. In the application described, the robots operate within a system which utilizes human operators to more efficiently perform the picking and placing of items, but the disclosure is equally applicable to robots having articulated arms to perform the picking and placing operations. In addition, the system described herein wherein robots navigate to poses (consisting of the x,y,z coordinates in the warehouse along with the orientation or the quaternion (x,y,z, ω) associated with each item they need to retrieve for an order and wherein each pose is correlated to a fiducial ID and ultimately a product SKU, is merely an exemplary system used to describe the describe the invention in context. The invention may be applied to other types of autonomous robot warehouse distribution systems.

While the description provided herein is focused on picking items from bin locations in the warehouse to fulfill an order for shipment to a customer, the system is equally applicable to the storage or placing of items received into the warehouse in bin locations throughout the warehouse for later retrieval and shipment to a customer. The invention is also applicable to inventory control tasks associated with such a warehouse system, such as, consolidation, counting, verification, inspection and clean-up of products.

Referring to FIG. 1, a typical order-fulfillment warehouse 10 includes shelves 12 filled with the various items that could be included in an order 16. In operation, the order 16 from warehouse management server 15 arrives at an order-server 14. The order-server 14 communicates an order or group of orders (an order set) 16 to a robot 18 (which may be an autonomous mobile robot) selected from a plurality of robots that roam the warehouse 10. Also shown is charging area 19, which is where one or more charging stations may be located.

Figure 2A:
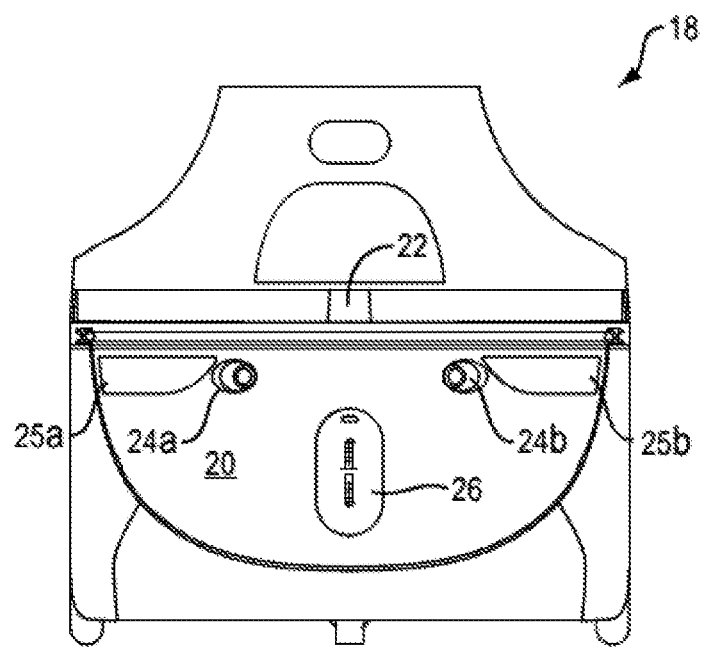
FIG. 2A is a front elevational view of a base of one of the robots used in the warehouse shown in FIG. 1.
Figure 2B:
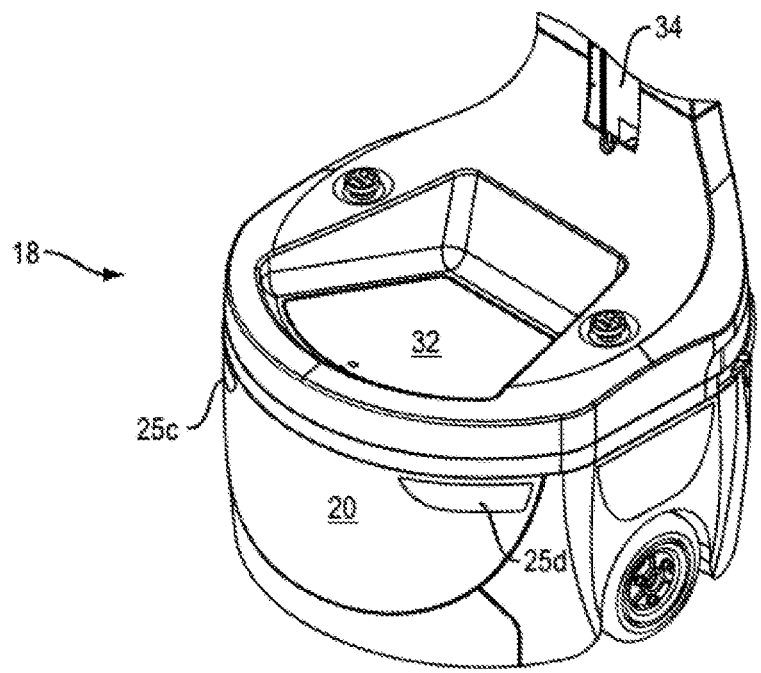
FIG. 2B is a perspective view of a base of one of the robots used in the warehouse shown in FIG. 1.

In a preferred embodiment, a robot 18, shown in FIGS. 2A and 2B, includes an autonomous wheeled base 20 having a laser-radar 22. The base 20 also features a transceiver (not shown) that enables the robot 18 to receive instructions from the order-server 14, and a pair of digital optical cameras 24a and 24b. The robot base also includes an electrical charging port 26 for re-charging the batteries which power autonomous wheeled base 20. The base 20 further features a processor (not shown) that receives data from the laser-radar and cameras 24a and 24b to capture information representative of the robot's environment. There are lights 25a-d, which can be used to signal to the operators the mode of operation of the robot. For example, when the robot is in route to a pose destination, the lights may be lighted a particular color such as blue. They may be lighted a different color when they are at a pose location and ready to be serviced. They may be strobed or simply remain on to indicate different modes.

Figure 3:
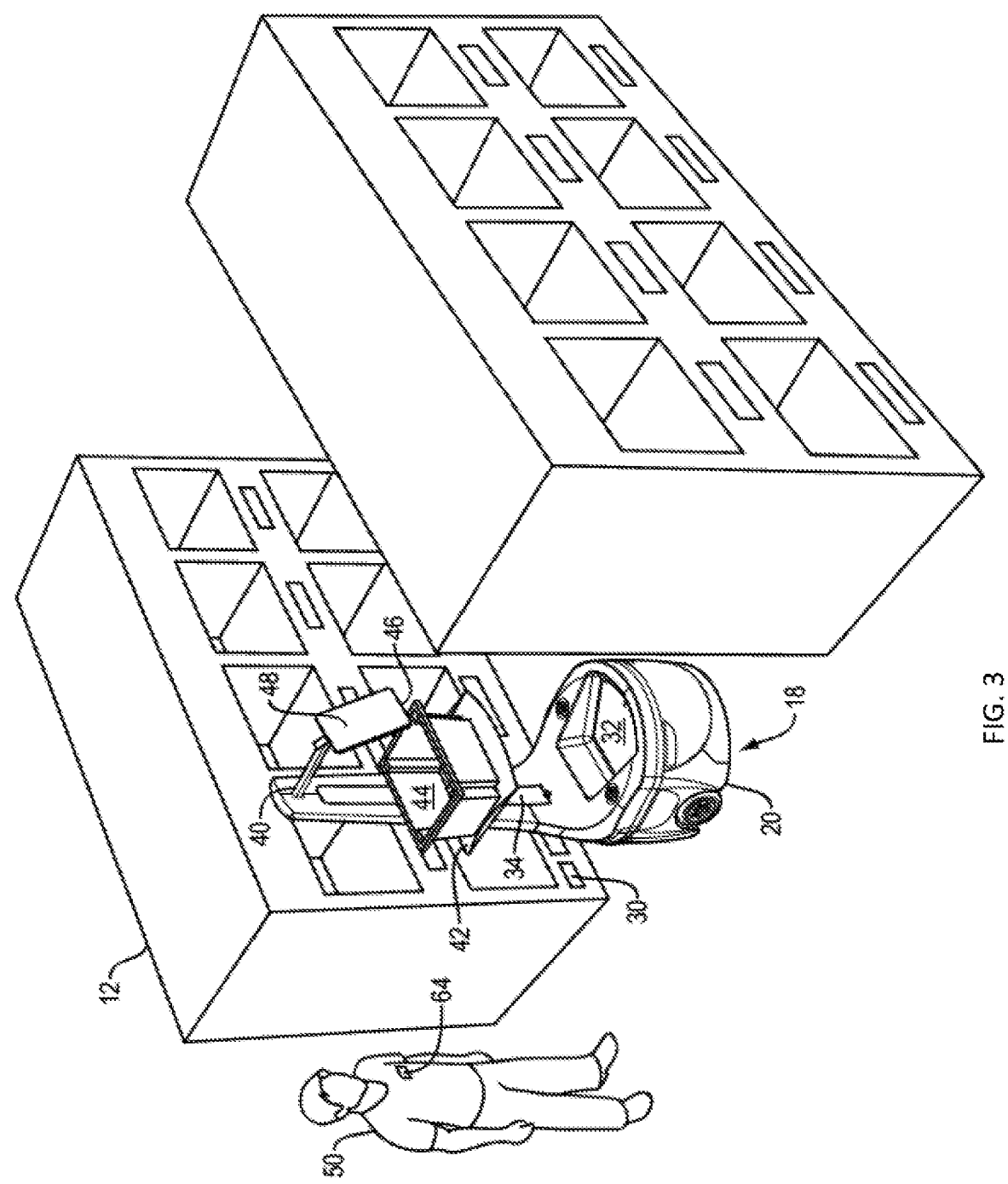
FIG. 3 is a perspective view of the robot in FIG. 2 outfitted with an armature and parked in front of a shelf shown in FIG. 1.

Robot 18 has a memory (not shown) that operates with the processor to carry out various tasks associated with navigation within the warehouse 10, as well as to navigate to fiducial marker 30 placed on shelves 12, as shown in FIG. 3. Fiducial marker 30 (e.g. a two-dimensional bar code) corresponds to bin/location of an item ordered. The navigation approach of this invention is described in detail below with respect to FIGS. 4-8. Fiducial markers are also used to identify charging stations and the navigation to such charging station fiducial markers is the same as the navigation to the bin/location of items ordered. Once the robots navigate to a charging station, a more precise navigation approach is used to dock the robot with the charging station and such a navigation approach is described below.

Referring again to FIG. 2B, base 20 includes an upper surface 32 where a tote or bin could be stored to carry items. There is also shown a coupling 34 that engages any one of a plurality of interchangeable armatures 40, one of which is shown in FIG. 3. The particular armature 40 in FIG. 3 features a tote-holder 42 (in this case a shelf) for carrying a tote 44 that receives items, and a tablet holder 46 (or laptop/other user input device) for supporting a tablet 48. In some embodiments, the armature 40 supports one or more totes for carrying items. In other embodiments, the base 20 supports one or more totes for carrying received items. As used herein, the term "tote" includes, without limitation, cargo holders, bins, cages, shelves, rods from which items can be hung, caddies, crates, racks, stands, trestle, containers, boxes, canisters, vessels, and repositories.

A robot 18 may pick items from a shelf and placing them in the tote 44 with a robotic articulated arm. Another way of picking items is to use a local operator 50, which is typically human, to carry out the task of physically removing an ordered item from a shelf 12 and placing it on robot 18, for example, in tote 44. The robot 18 communicates the item needed to the local operator 50 via the tablet 48 (or laptop/other user input device), which the local operator 50 can read, or by transmitting the order to a handheld device used by the local operator 50. The process described herein is equally applicable to robots having articulated arms to perform the picking and placing operations.

Upon receiving an order/order set 16 from the order server 14, the robot 18 proceeds to a first warehouse location, e.g. as shown in FIG. 3, to execute the function (e.g. pick/place) for the first item in the order/order set. It does so based on navigation software stored in the memory and carried out by the processor. The navigation software relies on data concerning the environment, as collected by the laser-radar 22, an internal table in memory that identifies the fiducial identification ("ID") of fiducial marker 30 that corresponds to a location in the warehouse 10 where a particular item can be found, and the cameras 24a and 24b to navigate.

Upon reaching the correct location, the robot 18 parks itself in front of a shelf 12 on which the item is stored and waits for a local operator 50 to retrieve the item from the shelf 12 and place it in tote 44. If robot 18 has other items to retrieve it proceeds to those locations. The item(s) retrieved by robot 18 are then delivered to a packing station 100, FIG. 1, where they are packed and shipped.

It will be understood by those skilled in the art that each robot may be fulfilling one or more orders and each order may consist of one or more items when the robots have sufficient capacity and the proper tote configuration.

In order to simplify the description of the invention, a single robot 18 and operator 50 are described. However, as is evident from FIG. 1, a typical fulfillment operation includes many robots and operators working among each other in the warehouse to fill a continuous stream of orders.

The navigation approach of this invention, as well as the semantic mapping of a SKU of an item to be retrieved to a fiducial ID/pose associated with a fiducial marker in the warehouse where the item is located, is described in detail below with respect to FIGS. 4-8. As noted above, the same navigation approach may be used to enable the robot to navigate to a charging station in order to recharge its battery.

Using one or more robots 18, a map of the warehouse 10 must be created and dynamically updated to determine the location of objects, both static and dynamic, as well as the locations of various fiducial markers dispersed throughout the warehouse. One or more of the robots 18 navigate the warehouse and build/update a map 10a, FIG. 4, utilizing its laser-radar 22 and simultaneous localization and mapping (SLAM), which is a computational method of constructing or updating a virtual map of an unknown environment. Popular SLAM approximate solution methods include the particle filter and extended Kalman filter. The SLAM GMapping approach is the preferred approach, but any suitable SLAM approach can be used.

Robot 18 utilizes its laser-radar 22 to create/update map 10a of warehouse 10 as robot 18 travels throughout the space identifying open space 112, walls 114, objects 116, and other static obstacles such as shelves 12a in the space, based on the reflections it receives as the laser-radar scans the environment.

Figure 4:
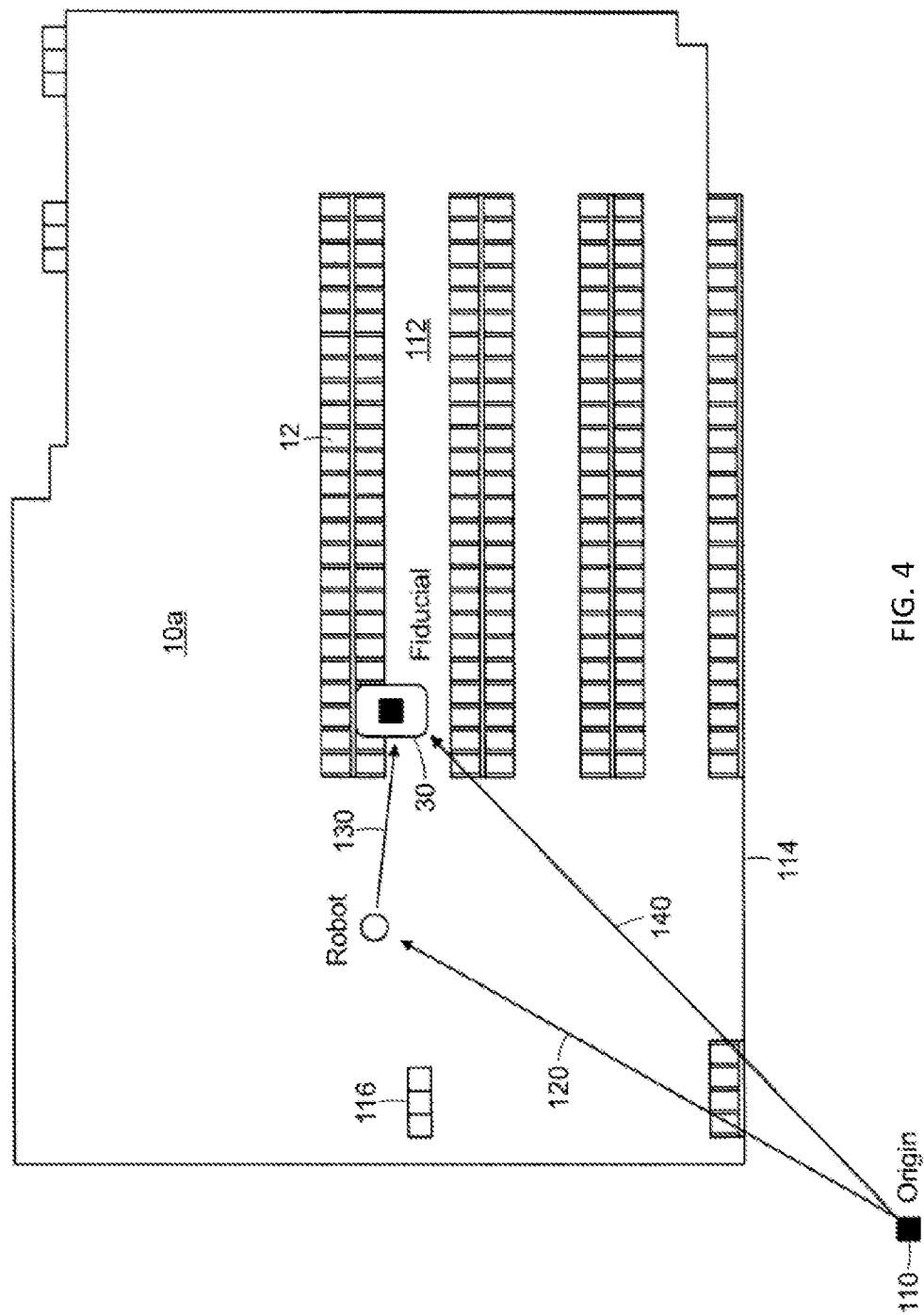
FIG. 4 is a partial map of the warehouse of FIG. 1 created using laser radar on the robot.

While constructing the map 10a or thereafter, one or more robots 18 navigates through warehouse 10 using cameras 24a and 24b to scan the environment to locate fiducial markers (two-dimensional bar codes) dispersed throughout the warehouse on shelves proximate bins, such as 32 and 34, FIG. 3, in which items are stored. Robots 18 use a known reference point or origin for reference, such as origin 110. When a fiducial marker, such as fiducial marker 30, FIGS. 3 and 4, is located by robot 18 using its cameras 24a and 24b, the location in the warehouse relative to origin 110 is determined. By using two cameras, one on either side of robot base, as shown in FIG. 2A, the robot 18 can have a relatively wide field of view (e.g. 120 degrees) extending out from both sides of the robot. This enables the robot to see, for example, fiducial markers on both sides of it as it travels up and down aisles of shelving.

By the use of wheel encoders and heading sensors, vector 120, and the robot's position in the warehouse 10 can be determined. Using the captured image of a fiducial marker/two-dimensional barcode and its known size, robot 18 can determine the orientation with respect to and distance from the robot of the fiducial marker/two-dimensional barcode, vector 130. With vectors 120 and 130 known, vector 140, between origin 110 and fiducial marker 30, can be determined. From vector 140 and the determined orientation of the fiducial marker/two-dimensional barcode relative to robot 18, the pose, which comprises its position (x, y, z coordinates) in the warehouse along with its orientation or quaternion (x, y, z, ω) for fiducial marker 30 can be determined. It should be noted that the coordinates may only include x and y coordinates as the fiducial pose is typically located on the floor and thus the z coordinate is zero.

Figure 5:
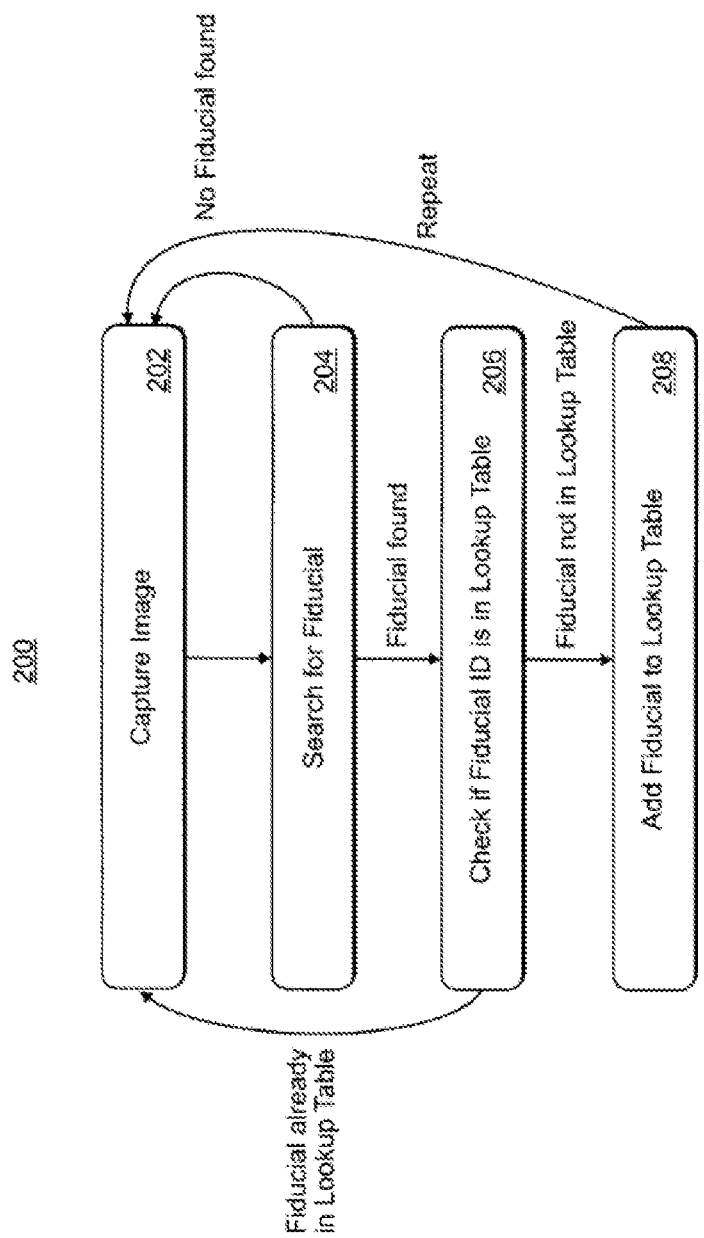
FIG. 5 is a flow chart depicting the process for locating fiducial markers dispersed throughout the warehouse and storing fiducial marker poses.

Flow chart 200, FIG. 5, describing the fiducial marker location process is described. This is performed in an initial mapping mode and as robot 18 encounters new fiducial markers in the warehouse while performing picking, placing and/or other tasks. In step 202, robot 18 using cameras 24a and 24b captures an image and in step 204 searches for fiducial markers within the captured images. In step 206, if a fiducial marker is found in the image (step 204) it is determined if the fiducial marker is already stored in fiducial table 300, FIG. 6, which may be located in memory 34 of robot 18 and/or in the warehouse management system 15. If the fiducial information is stored in memory already, the flow chart returns to step 202 to capture another image. If it is not in memory, the pose is determined according to the process described above and in step 208, it is added to fiducial to pose lookup table 300.

In look-up table 300, which may be stored in the memory of each robot and/or in the warehouse management system 15, there are included for each fiducial marker, a fiducial identification, 1, 2, 3, etc., and a pose for the fiducial marker/bar code associated with each fiducial identification. As indicated above, the pose consists of the x,y,z coordinates in the warehouse along with the orientation or the quaternion (x,y,z, ω).

In another look-up Table 400, FIG. 7, which may also be stored in the memory of each robot and/or in the warehouse management system 15, is a listing of bin locations (e.g. 402a-f) within warehouse 10, which are correlated to particular fiducial ID's 404, e.g. number "11". The bin locations, in this example, consist of seven alpha-numeric characters. The first six characters (e.g. L01001) pertain to the shelf location within the warehouse and the last character (e.g. A-F) identifies the particular bin at the shelf location. In this example, there are six different bin locations associated with fiducial ID "11". There may be one or more bins associated with each fiducial ID/marker. Charging stations located in charging area 19, FIG. 1, may also be stored in table 400 and correlated to fiducial IDs. From the fiducial IDs, the pose of the charging station may be found in table 300, FIG. 6.

The alpha-numeric bin locations are understandable to humans, e.g. operator 50, FIG. 3, as corresponding to a physical location in the warehouse 10 where items are stored. However, they do not have meaning to robot 18. By mapping the locations to fiducial ID's, robot 18 can determine the pose of the fiducial ID using the information in table 300, FIG. 6, and then navigate to the pose as described herein.

Figure 8:
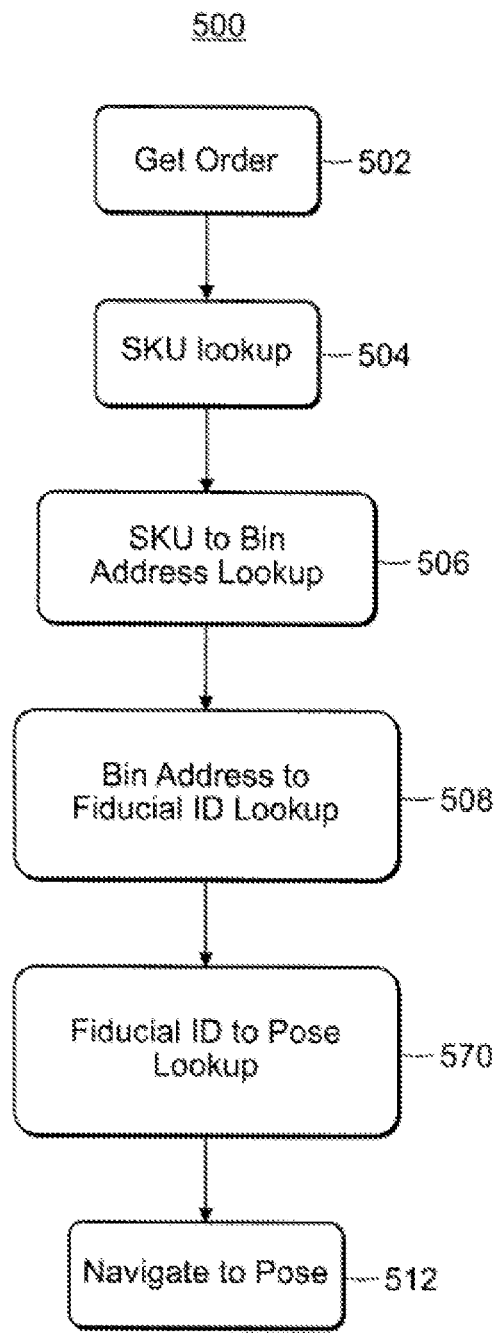
FIG. 8 is a flow chart depicting product SKU to pose mapping process.

The order fulfillment process according to this invention is depicted in flow chart 500, FIG. 8. In step 502, warehouse management system 15, FIG. 1, obtains an order, which may consist of one or more items to be retrieved. In step 504 the SKU number(s) of the items is/are determined by the warehouse management system 15, and from the SKU number(s), the bin location(s) is/are determined in step 506. A list of bin locations for the order is then transmitted to robot 18. In step 508, robot 18 correlates the bin locations to fiducial ID's and from the fiducial ID's, the pose of each fiducial ID is obtained in step 510. In step 512 the robot 18 navigates to the pose as shown in FIG. 3, where an operator can pick the item to be retrieved from the appropriate bin and place it on the robot.

Item specific information, such as a SKU number and bin location, obtained by the warehouse management system 15, can be transmitted to tablet 48 on robot 18 so that the operator 50 can be informed of the particular items to be retrieved when the robot arrives at each fiducial marker location.

With the SLAM map and the pose of the fiducial ID's known, robot 18 can readily navigate to any one of the fiducial ID's using various robot navigation techniques. The preferred approach involves setting an initial route to the fiducial marker pose given the knowledge of the open space 112 in the warehouse 10 and the walls 114, shelves (such as shelf 12) and other obstacles 116. As the robot begins to traverse the warehouse using its laser radar 22, it determines if there are any obstacles in its path, either fixed or dynamic, such as other robots 18 and/or operators 50, and iteratively updates its path to the pose of the fiducial marker. The robot re-plans its route about once every 50 milliseconds, constantly searching for the most efficient and effective path while avoiding obstacles.

Generally, localization of the robot within warehouse 10a is achieved by many-to-many multiresolution scan matching (M3RSM) operating on the SLAM virtual map. Compared to brute force methods, M3RSM dramatically reduces the computational time for a robot to perform SLAM loop closure and scan matching, two critical steps in determining robot pose and position. Robot localization is further improved by minimizing the M3 SRM search space according to methods disclosed in related U.S. application Ser. No. 15/712,222, entitled Multi-Resolution Scan Matching with Exclusion Zones, filed on Sep. 22, 2017 and incorporated by reference in its entirety herein.

With the product SKU/fiducial ID to fiducial pose mapping technique combined with the SLAM navigation technique both described herein, robots 18 are able to very efficiently and effectively navigate the warehouse space without having to use more complex navigation approaches typically used which involve grid lines and intermediate fiducial markers to determine location within the warehouse.

Generally, navigation in the presence of other robots and moving obstacles in the warehouse is achieved by collision avoidance methods including the dynamic window approach (DWA) and optimal reciprocal collision avoidance (ORCA). DWA computes among feasible robot motion trajectories an incremental movement that avoids collisions with obstacles and favors the desired path to the target fiducial marker. ORCA optimally avoids collisions with other moving robots without requiring communication with the other robot(s). Navigation proceeds as a series of incremental movements along trajectories computed at the approximately 50 ms update intervals. Collision avoidance may be further improved by techniques described in related U.S. application Ser. No. 15/712,256, entitled Dynamic Window Approach Using Optimal Reciprocal Collision Avoidance Cost-Critic, filed on Sep. 22, 2017 and incorporated by reference in its entirety herein.

Figure 9:
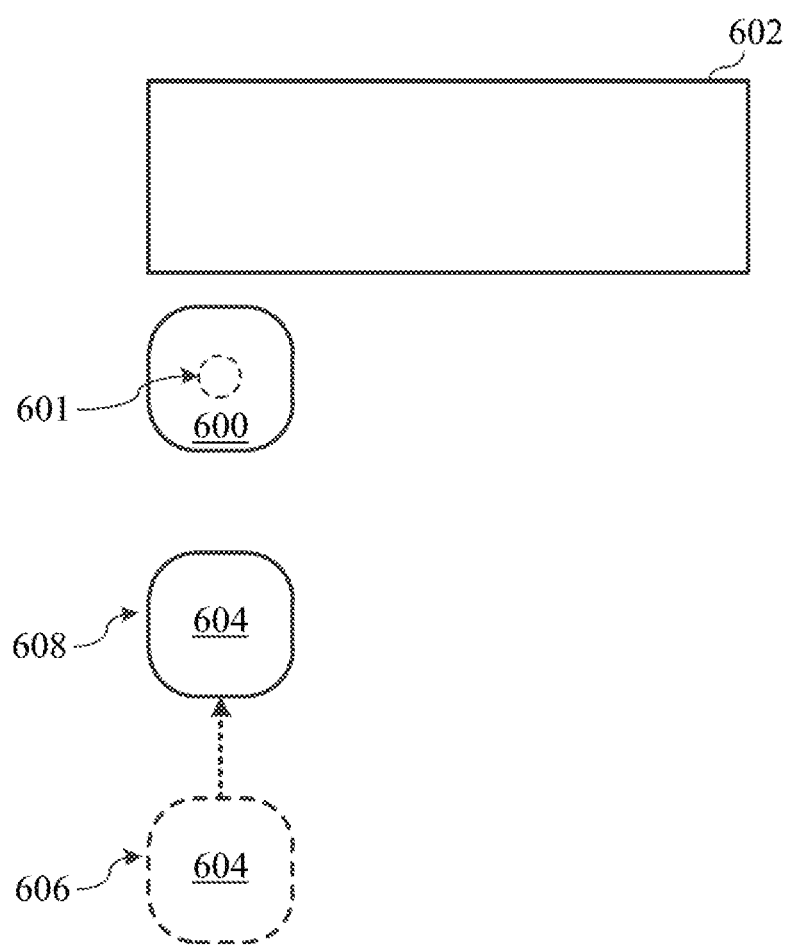
FIG. 9 is a schematic diagram of a robot approaching a pose which is occupied by another robot to depict a situation when assuming manual control of the robot may improve efficiency.

The above described process is a very efficient order fulfillment process; however, there are potential situations that may result in less than optimal efficiency. One such situation is depicted in FIG. 9, which shows a robot 600 positioned at a pose location 601 associated with an item stored in a bin on shelf unit 602. Coincidentally, robot 604 may be destined for that same pose 601 to retrieve an item from a bin on shelf unit 602. The item/bin targeted by robot 604 may be but need not be the same item/bin targeted by robot 600. As described above, a fiducial ID and its associated pose may be correlated to a number of bin locations containing different items. Moreover, robot 604 may be trying to execute a "place" function from the pose which it is destined while robot 600 is trying to execute a "pick" function from the same pose, or vice versa.

As robot 604 is executing its latest action (e.g. a pick/place function) in an order 16 which it received from the order server 14, it does so by traveling toward the pose of the fiducial ID associated with the item on which the action is to be executed based on navigation software stored in the memory and carried out by the processor as described above. The movement of robot 604 is depicted in FIG. 9 as it travels from location 606 in the direction of pose 601. When robot 604 is in the proximity of the destination pose, using its LIDAR or another sensor such as its optical cameras, it determines if the destination pose is blocked by another robot a human, or an object. In the example of FIG. 9, robot 600, is positioned at or obstructing the location of the destination pose. When an object is detected by robot 604 to be obstructing the destination pose, robot 604 may stop its movement toward the pose at a location 608 spaced a distance, D, from the pose. It can vary how far the robot stops from a blocked destination pose location, but it may be based in part on the size of the blocking object as well as other factors. A typical distance may be 1-3 meters from the blocking object It is possible for a robot to simply wait at location 608 until robot 600 leaves the destination pose and then move to the pose once unoccupied. Another option is for robot 600 to be placed in a queue location in the manner described in U.S. Pat. No. 9,776,324. However, neither of these options may necessarily provide the most efficient manner of operation. Moreover, there may be an object (other than a robot) blocking the pose that will not be moved for an extended period of time, such as a box or a pallet. In that case, it certainly would be inefficient for robot 604 to wait at location 608 or in a queue location until such an object is moved before move into the pose and carrying out its assigned action.

Figure 10:
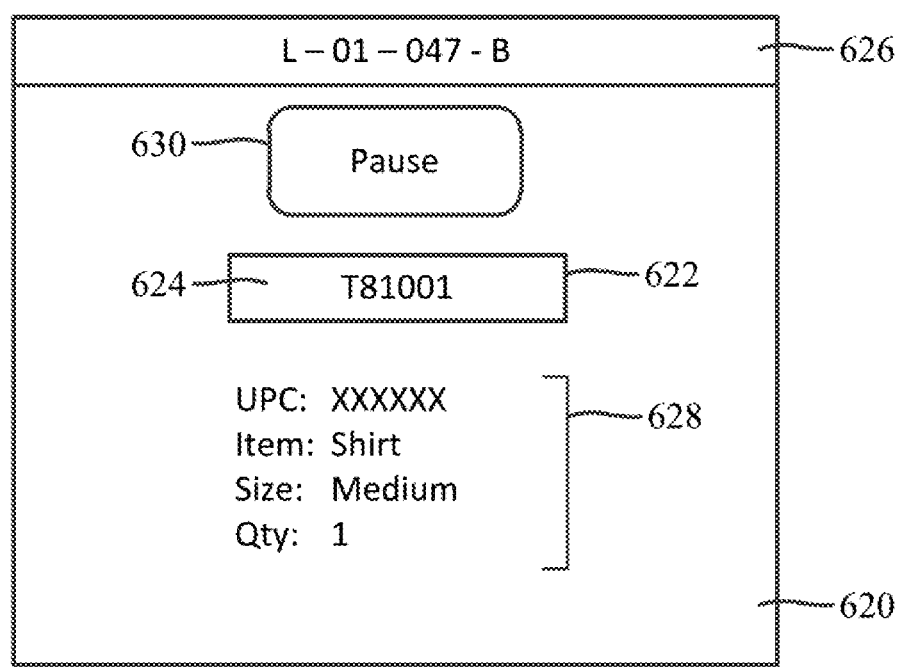
FIG. 10 is a display of the screen of a tablet device which may be mounted on the robot depicting a pause button for assuming manual control of the robot.
Figure 11:
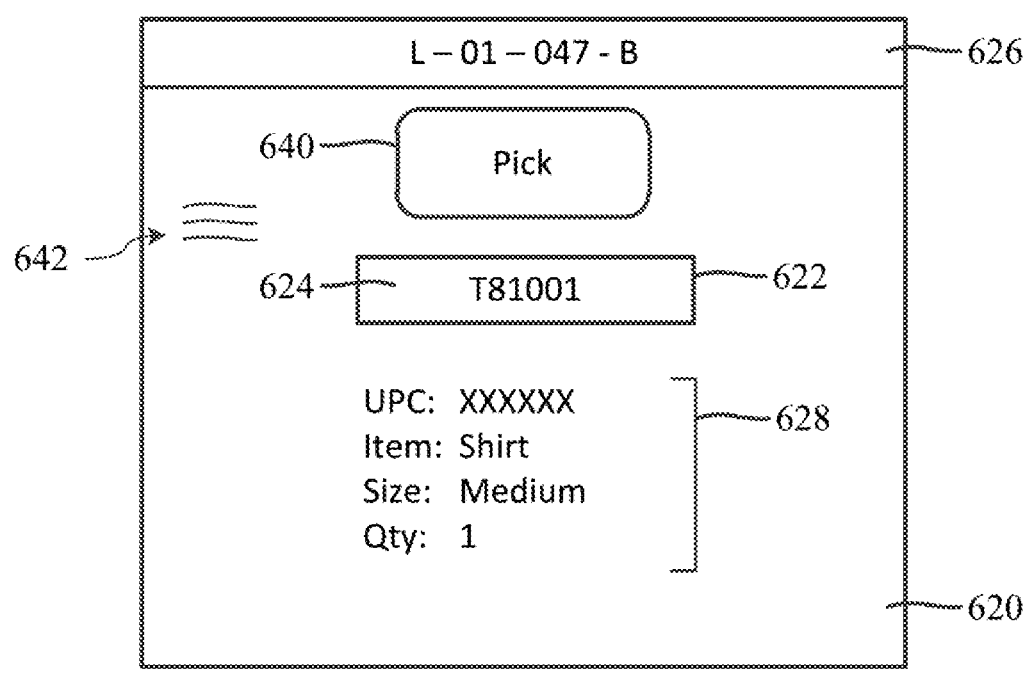
FIG. 11 is the display of the screen of a tablet device as shown in FIG. 10 depicting a manual mode "pick" button for assuming manual control of the robot to pick the item in place and a "menu" button for selecting other mode options.
Figure 12:
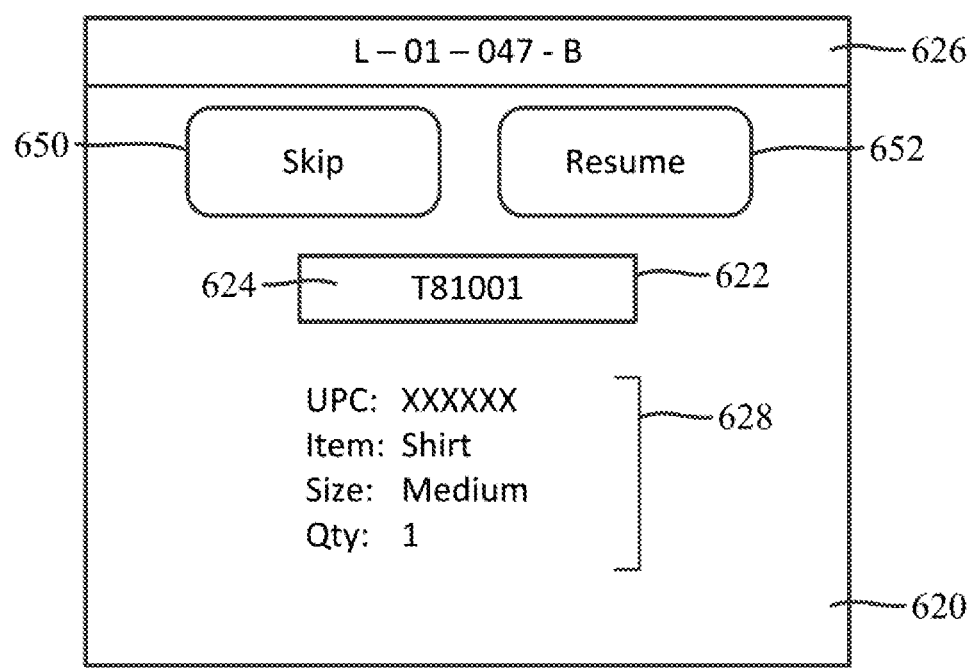
FIG. 12 is a display of the screen of a tablet device as shown in FIG. 10 depicting a manual mode "skip" button for assuming manual control of the robot to skip current item and a "resume" button for causing the robot to return to autonomous mode.

An aspect of this invention to address the above situation is described with regard to FIGS. 10-12. Once the robot is stopped at a location short of its ultimate destination, such as location 608 for robot 604 shown in FIG. 9, the robot 604 may communicate to any nearby operator(s) that it is unable to reach its ultimate destination by, for example, providing a light signal. As an example of a light signal, when the robot is unable to reach its destination and it stops traveling, it may transition from a blue solid lighting (indicating normal operation while traveling to its ultimate destination) to yellow lighting indicating that it is unable to reach its ultimate destination and it has entered a holding mode as a result. Such light signals may be emanated from lights 25a through 25d as shown in FIGS. 2A and 2B. It should be noted that various other light signals may be used or other forms of signaling may be used as well.

Seeing that the robot 604 is in a holding mode, an operator may approach the robot and view display 620 of the tablet, as depicted in FIG. 10. The display 620 may show the container number "T81001" at location 622, which corresponds to a container or compartment on a storage array being carried by robot 600 to let the operator know where the next item to be picked needs to be placed on the robot. In addition, although not visible in this black and white drawing, the color of area 624 surrounding the container number may correspond to the color of the container to make it even easier for the operator to know where the item is to be placed. At location 626 on display 620, the bin location, in this case "L-01-047-B", which corresponds to a bin location on shelf unit 602 of FIG. 9 proximate pose 601, is displayed for an operator to read. Also on display 620 is the item information at location 628, which in this case indicates that the item to be picked is a "shirt", size "medium", color "blue" and quantity "1". The UPC code may also be provided for the operator to verify an exact item match. From this information, the operator can readily locate the item in the identified bin location and place it in the proper container on the robot.

Since the robot has not reached its ultimate destination; namely pose 601, and it has entered a holding mode, a pause button 630 may be displayed on display 620. By pressing the pause button, the operator is able to take manual control of the robot 604. Upon taking manual control of the robot the lighting signal may transition from solid yellow lighting to strobed yellow lighting, for example, indicating that an operator has taken manual control of the robot. Any type of signaling may be used to show the different modes of operation.

Once pause button 630 is pressed, as shown in FIG. 11, a "pick" button 640 may be displayed. By pressing the "pick" button, the operator has selected to operate the robot in a manual "pick mode", which ensures the robot will remain in place at location 608 while the operator proceeds to the appropriate bin to pick the item. In the manual pick mode, the robot will not proceed to its intended destination at pose 601 even if robot 600 leaves pose 601. After the operator scans the bar code of the selected item and confirms the quantity, the operator may select the "resume" button, as described below, and the robot will transition from manual mode back to autonomous mode and after which the robot may proceed to pick the next item in its order. This manual control capability allows an operator to proceed with the pick before the robot would normally signal that it is ready for the operator to make the pick, thus saving time that would otherwise be wasted while the robot waits for the pose location to become free.

As an alternative to selecting the pick button 640, the operator may select the "menu" button 642, FIG. 11, which may cause a "skip" button 650 and/or a "resume" button 652 to be displayed, as shown in FIG. 12. If the "skip" button 650 is selected, then robot 606 will skip the next item to be picked from shelf unit 602 proximate pose 601 and proceed to the remaining item(s) in its order for execution. The skip button may be selected, for example, in the situation where the item to be retrieved is temporarily blocked from the reach of the operator. After completing execution of the remaining item(s) in the order, the robot may then return to try again to complete the pick process of the item skipped.

Instead of selecting the "skip" button 650, the operator may select the "resume" button 652, which will take the robot out of manual mode (strobing yellow light) and return it to holding mode (solid yellow light) until, as in the example shown in FIG. 9, the pose location 601 becomes free when the robot 600 moves away from shelf unit 602 heading towards its next location. Or, if the "resume" button is pressed after the "pick" button was previously selected and the pick manually performed, the robot will transition from manual mode back to autonomous mode and proceed to pick the next item in its order.

While the foregoing description of the invention enables one of ordinary skill to make and use what is considered presently to be the best mode thereof, those of ordinary skill will understand and appreciate the existence of variations, combinations, and equivalents of the specific embodiments and examples herein. The above-described embodiments of the present invention are intended to be examples only. Alterations, modifications and variations may be effected to the particular embodiments by those of skill in the art without departing from the scope of the invention, which is defined solely by the claims appended hereto. The invention is therefore not limited by the above described embodiments and examples.

We claim:

1. A method for performing tasks on items located in a space using a robot, the method comprising:
    receiving an order to perform a task on at least one item;
    obtaining a pose associated with the at least one item; the pose being in a coordinate system defined by the space and the pose being where the task is to be performed on the at least one item;
    navigating the robot toward the pose associated with the at least one item;
    detecting that the pose is obstructed by an object;
    halting the robot at a location spaced from the pose; and
    causing the robot to provide a first signal indicating that the robot is in a holding mode at the location spaced from the pose;
    providing on a display inputs to allow a human operator to select one of pausing continued operation of the robot, bypassing the pose, or remaining in the holding mode;
    wherein when the human operator selects the display input of pausing continued operation of the robot, causing the robot to pause at the location spaced from the pose to have the operator perform the task on the at least one item even though the robot has not reached the pose;
    wherein when the human operator selects the display input of bypassing the pose, causing the robot to bypass the pose without performing the task on the at least one item; and
    wherein when the human operator selects the display input of remaining in holding mode, causing the robot to remain in the holding mode until the robot detects that the pose is no longer obstructed by the object.

2. The method of claim 1 wherein when the human operator selects the display input of pausing continued operation of the robot, causing the robot to provide a second signal different from the first signal to indicate that continued operation of the robot has been paused.

3. The method of claim 2 wherein the first and second signals are provided by causing one or more lights on an exterior of the robot to be illuminated.

4. The method of claim 3 wherein the one or more lights on an exterior of the robot are caused to be illuminated in more than one color or in an intermittent manner to distinguish between the first and second signals.

5. The method of claim 1, wherein the task includes one of retrieving the at least one item and placing it on the robot or removing the at least one item from the robot and storing it proximate the pose.

6. The method of claim 1, wherein the space is a warehouse containing a plurality of items stored in a plurality of containers dispersed throughout the warehouse.

7. The method of claim 1, wherein the object is one of another robot, a human operator or an inanimate object.

8. A robot for performing tasks on items located in a space, the items being located proximate fiducial markers, each fiducial marker having a fiducial identification, the robot comprising:
    a processor configured to:
        receive an order to perform a task on at least one item;
        determine the fiducial identification associated with the at least one item;
        obtain, using the fiducial identification of the at least one item, a pose associated with a position of the fiducial marker with the determined fiducial identification, in a coordinate system defined by the space;
    a navigation system configured to navigate the robot to the pose of the fiducial marker associated with said determined fiducial identification;
    a display configured to communicate to an operator the task to be performed on the at least one item; and
    a sensor configured to detect that the pose is obstructed by an object;
    wherein, when the sensor detects that the pose is obstructed by an object, the processor is configured to stop the robot a location spaced from the pose and cause the robot to provide a first signal that the robot is in a holding mode;
    wherein the processor is configured to provide on the display inputs to allow a human operator to select one of pausing continued operation of the robot, bypassing the pose, or remaining in the holding mode;
    wherein when the human operator selects the display input of pausing continued operation of the robot, the processor is configured to cause the robot to pause at the location spaced from the pose to have the operator perform the task on the at least one item even though the robot has not reached the pose;
    wherein when the human operator selects the display input of bypassing the pose, the processor is configured to cause the robot to bypass the pose without performing the task on the at least one item; and wherein when the human operator selects the display input of remaining in holding mode, the processor is configured to cause the robot to remain in the holding mode until the robot detects that the pose is no longer obstructed by the object.

9. The robot of claim 8 wherein when the human operator selects the display input of pausing continued operation of the robot, the processor is configured to cause the robot to provide a second signal different from the first signal to indicate that continued operation of the robot has been paused.

10. The robot of claim 9 further including one or more lights on an exterior of the robot and wherein the processor is configured to cause the one or more lights to be illuminated to provide the first and second signals.

11. The robot of claim 10 wherein processor is configured to cause the one or more lights to be illuminated in more than one color or in an intermittent manner to distinguish between the first and second signals.

12. The robot of claim 8, wherein the task includes one of retrieving the at least one item and placing it on the robot or removing the at least one item from the robot and storing it proximate the pose.

13. The robot of claim 8, wherein the space is a warehouse containing a plurality of items stored in a plurality of containers dispersed throughout the warehouse.

14. The robot of claim 8, wherein the object is one of another robot or another human operator.

15. A method for performing tasks on items located in a space using a robot, the method comprising:
  receiving an order to perform a task on at least one item;
  determining a location associated with the at least one item;
  navigating the robot to the location associated with the at least one item; and
  communicating to an operator the task to be performed on the at least one item;
  wherein the method further includes:
  detecting that the location is obstructed by an object, stopping the robot spaced from the location,
  causing the robot to provide a first signal that the robot is in a holding mode; and
  providing on a display inputs to allow a human operator to select one of pausing continued operation of the robot, bypassing the location, or remaining in the holding mode;
  wherein when the human operator selects the display input of pausing continued operation of the robot, causing the robot to pause spaced from the location to have the operator perform the task on the at least one item even though the robot has not reached the location;
  wherein when the human operator selects the display input of bypassing the location, causing the robot to bypass the location without performing the task on the at least one item; and
  wherein when the human operator selects the display input of remaining in holding mode, causing the robot to remain in the holding mode until the robot detects that the location is no longer obstructed by the object.

16. A robot for performing tasks on items located in a space, the robot comprising:
  a processor configured to receive an order to perform a task on at least one item and to determine a location in the space associated with the at least one item;
  a navigation system configured to navigate the robot to the location;
  a display configured to communicate to an operator the task to be performed on the at least one item; and
  a sensor configured to detect that the location is obstructed by an object;
  wherein, when the sensor detects that the location is obstructed by an object, the processor is configured to stop the robot at a location spaced from the location and cause the robot to provide a first signal that the robot is in a holding mode;
  wherein the processor is configured to provide on the display inputs to allow a human operator to select one of pausing continued operation of the robot, bypassing the pose, or remaining in the holding mode;
  wherein when the human operator selects the display input of pausing continued operation of the robot, the processor is configured to cause the robot to pause spaced from the pose to have the operator perform the task on the at least one item even though the robot has not reached the location;
  wherein when the human operator selects the display input of bypassing the location, the processor is configured to cause the robot to bypass the location without performing the task on the at least one item; and
  wherein when the human operator selects the display input of remaining in holding mode, the processor is configured to cause the robot to remain in the holding mode until the robot detects that the location is no longer obstructed by the object.

\* \* \* \* \*